A. VERNAZ.
FILE.
APPLICATION FILED AUG. 13, 1910.

1,042,728.  Patented Oct. 29, 1912.

Witnesses  Inventor
  Alexis Vernaz
  By
   Attorney

COLUMBIA PLANOGRAPH CO., WASHINGTON, D. C.

A. VERNAZ.
FILE.
APPLICATION FILED AUG. 13, 1910.

1,042,728.  Patented Oct. 29, 1912.

Witnesses
Inventor
Alexis Vernaz
Attorney

UNITED STATES PATENT OFFICE.

ALEXIS VERNAZ, OF GENEVA, SWITZERLAND.

FILE.

1,042,728. Specification of Letters Patent. Patented Oct. 29, 1912.

Application filed August 13, 1910. Serial No. 577,020.

*To all whom it may concern:*

Be it known that I, ALEXIS VERNAZ, a citizen of the French Republic, residing at Geneva, in Switzerland, have invented certain new and useful Improvements in Files, of which the following is a specification.

This invention relates to improvements in files, composed of a core of softer metal such as iron and a facing on one or both sides of steel and consists of a file the teeth of which are formed by stamping, so as to produce cutting surfaces which may be considered as composed of straight, undulating or zigzag lines which however are broken by a number of comparatively small projections for the purpose of preventing any lateral slip of the tool during use. The act of stamping these teeth brings the steel into more intimate connection with the iron core or base, the iron being extended or indented by the stamping operation when the cutting surface is formed in the steel, which is effected before tempering the same.

The annexed drawings illustrate by way of example various forms of construction of the improved file.

Figure 1:
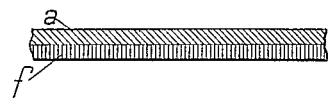
Figure 2:
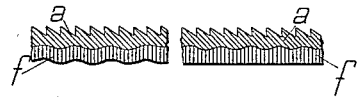
Figure 3:
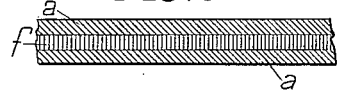
Figure 4:
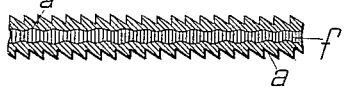
Figure 5:
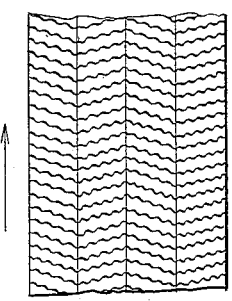
Figure 6:
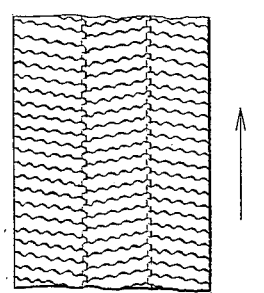
Figure 7:
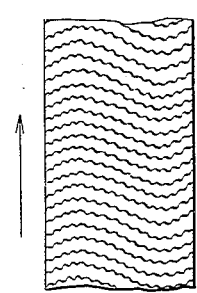
Figure 8:
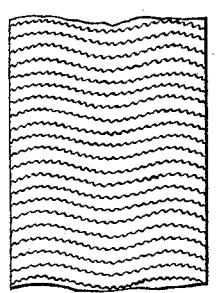
Figure 9:
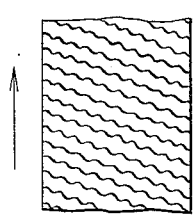
Figure 10:
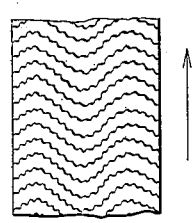
Figure 1:
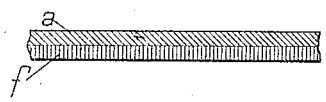
Figure 2:
Figure 3:
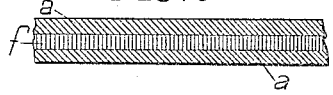
Figure 4:
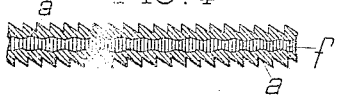
Figure 5:
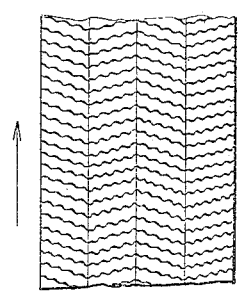
Figure 6:
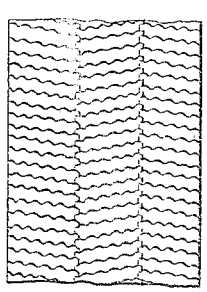
Figure 7:
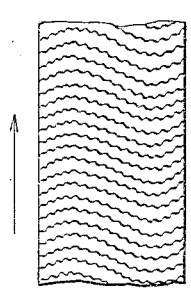
Figure 8:
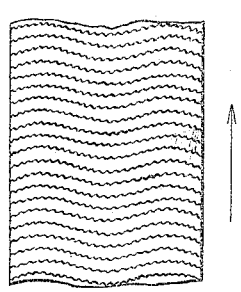
Figure 9:
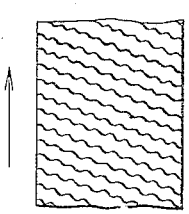
Figure 10:
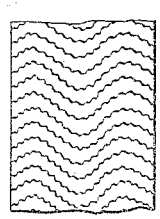

Figure 1 is a partial section of a bimetallic strip before being stamped to form the toothed cutting surface. Fig. 2 is a partial section showing on the left hand side a bimetallic strip the upper portion of which has been provided with teeth by stamping as hereinbefore indicated, the lower portion, that is to say, the part of softer metal being shown indented by said stamping operation. The right hand side of the figure shows a similar strip except that the bottom face of the lower portion of softer metal has been kept flat. Fig. 3 is a partial section showing a metallic strip formed of two parts of steel and one of iron, the latter lying in the center. Fig. 4 is a partial section showing a form of construction obtained from the metallic strip shown in Fig. 3 the upper and lower cutting surfaces being simultaneously formed by means of superposed stamping tools or the like. Figs. 5 to 10 are detail plan views illustrating various cutting surfaces, the teeth of all of which in front of the cutting part are provided with numerous small and closely placed projections. The arrows indicate the direction of use of the respective tool for the filing operation. In Figs. 5 and 6 the rows of teeth are arranged in herring bone fashion. Figs. 7, 8 and 10 show the teeth arranged in undulating lines. Fig. 9 shows a file with inclined or diagonal teeth provided with the small projections of rectangular form.

In the drawing $a$ may be taken to indicate steel and $f$ to indicate iron.

In the examples described above the general line of the teeth is broken by the closely placed and numerous projections above referred to.

What I claim as my invention and desire to secure by Letters Patent of the United States is:—

A file formed of welded strips of hard and relatively softer metals, the surface of the former having stamped cutting teeth and the adjacent surfaces of the metals having interfitting indentations, substantially as described.

In witness whereof I have signed this specification in the presence of two witnesses.

ALEXIS VERNAZ.

Witnesses:
L. H. MUNIER,
CHS. HUMBERT.

Copies of this patent may be obtained for five cents each, by addressing the "Commissioner of Patents, Washington, D. C."